United States Patent [19]

Nakano et al.

[11] Patent Number: 4,976,785
[45] Date of Patent: Dec. 11, 1990

[54] PAINT RESIN

[75] Inventors: Shinji Nakano, Takatsuki; Koichi Tsutsui, Tsuzuki; Shoji Ikeda, Hirakata; Yoji Hirasawa, Soraku, all of Japan

[73] Assignee: Nippon Paint Co., Ltd., Osaka, Japan

[21] Appl. No.: 309,894

[22] Filed: Feb. 14, 1989

Related U.S. Application Data

[63] Continuation of Ser. No. 116,679, Nov. 3, 1987, abandoned.

[30] Foreign Application Priority Data

Nov. 6, 1986 [JP] Japan ................................ 61-265136

[51] Int. Cl.$^5$ ............................................. C08L 93/00
[52] U.S. Cl. ................................ 106/287.17; 106/218; 106/241; 556/183; 525/523; 525/533; 525/437; 525/444.5; 525/370; 525/453; 525/454
[58] Field of Search ................... 106/287.17, 218, 241, 106/500; 556/183; 525/523, 533, 437, 444.5, 370, 453, 454

[56] References Cited

U.S. PATENT DOCUMENTS

| | | | |
|---|---|---|---|
| 2,839,421 | 6/1958 | Albisetti | 106/287.17 |
| 3,769,254 | 10/1973 | Anderson et al. | 525/370 |
| 4,046,729 | 9/1977 | Scriven et al. | 106/243 |
| 4,056,495 | 11/1977 | Kawamura et al. | 106/252 |
| 4,075,178 | 2/1978 | Turner | 525/437 |
| 4,354,013 | 10/1982 | Kimura | 525/523 |
| 4,556,683 | 12/1985 | Hirasawa et al. | 106/308 M |
| 4,560,716 | 12/1985 | Sato et al. | 523/451 |
| 4,576,647 | 3/1986 | Matsushita | 106/266 |
| 4,599,155 | 7/1986 | Suzuki et al. | 525/533 |
| 4,693,846 | 9/1987 | Piccirilli et al. | 106/29 |

*Primary Examiner*—William R. Dixon, Jr.
*Assistant Examiner*—Helene Klemanski
*Attorney, Agent, or Firm*—Wenderoth, Lind & Ponack

[57] ABSTRACT

Disclosed is a paint resin prepared by reacting an aluminum chelate compound with a resin having an active hydrogen bonded to an electrophilic atom or atomic group, and/or epoxy group.

12 Claims, No Drawings

PAINT RESIN

This application is a continuation of application Ser. No. 116,679, filed Nov. 3, 1987, now abandoned.

FIELD OF THE INVENTION

The present invention relates to a paint resin which affords good pigment dispersion to a wide range of pigments and which can provide a pigment paste having good storage stability.

BACKGROUND OF THE INVENTION

Pigments are incorporated in compositions such as paints and inks for giving color thereto. This is a very painstaking task because of poor the dispesibility of pigments. In order to disperse a pigment in a composition, such as a paint, it is a conventional practice to prepare a so-called pigment paste first by premixing a small amount of resin throughly with the pigment and then dilute the same with a specified resin and a solvent into a paint or ink composition. It is necessary that the resin must have a very high degree of affinity to pigments and no activity which is detrimental to the properties of the target paint and other compositions.

Now, it is generally understood that most pigments have an acidic, basic, or amphoteric capacity, and it has been reported that improved dispersibility could be obtained by intoroducing a group having a capacity contrary to such capacity of a pigment into a resin. For example, it has been proposed to introduce into the resin an acidic group or a basic group, or both of them, in order to improve its affinity to the pigment. From the angle of resin configuration, there has been proposed a star-form resin having chains extending radially from the center as produced by a polymerization reaction of a central material having several active points which act as starting points of the reaction. This star-form resin makes it easy to obtain a pigment paste of low viscosity, because the resin itself is of low viscosity. In addition, attempts have been made to further improve the capabilities of this star-form resin by incorporating an acidic group and/or a basic group therein.

However, none of the above mentioned methods have been fully successful and further property improvement of the properties is demanded.

The present inventors have found that a modified aluminum chelate resin produced by reacting an aluminum chelate with a resin having an active hydrogen bonded to an electrophilic atom or atomic group and/or an epoxy group has excellent pigment dispersibility, and that a paint prepared using the resin had various high-value capabilities. The modified aluminum chelate resin showed good dispersibility in relation to a wide range of pigments, whether acidic or basic, or amphoteric, and good improvement was found with pigment pastes thus obtained in respect to coloring power, gloss and fluidity.

It may be noted that in order to improve the dispersibility of pigments, several methods are known which are directed to chemically treating the surface of pigment particles, including, for example, methods for treating the particles with aluminum chelate (Japanese Patent Publication (unexamined) No. 125475/1981 and 195163/1975), and a method for treating with a titanium compound (Japanese Patent Publication (unexamined) No. 145448/1975). In these methods, however, it is necessary that the pigment and such metallic compound be thoroughly mixed in a mortar before the pigment is dispersed, which is quite laborious work.

The present invention, as above stated, is such that a specific resin is modified with aluminum chelate, and therefore it is clearly different which a pigment is treated with an aluminum chelate.

Hitherto, it has been known that a coating composition containing an aluminum chelate compound therein is liable to cause gelation of the resin component present therein during storage. When causing such specific resin as above mentioned to react with an aluminum chelate compound was, some anxiety about progress of gelation. In fact, however, there was no progress of gelation and the reaction of the specific resin with the aluminum chelate compound progressed smoothly.

SUMMARY OF THE INVENTION

The present invention is based on the above findings, and its subject matter consists in a paint resin produced by reacting an aluminum chelate compound with a resin having an active hydrogen bonded to an electrophilic atom or atomic group, and/or an epoxy group.

In this invention, various kinds of resins which are conventionally used for paint preparation may be used, provided that they must have an active hydrogen and/or epoxy group bonded to an electrophilic atomic group. To give examples of paint resins, usually polyol, polyester, alkyd, acrylic, urea, melamine, polyamide, polyurethane, and epoxy resins can be mentioned. If these resins have an active hydrogen and/or epoxy group bonded to an electrophilic atom or atomic group, they can be used as such for the purpose of the invention. If they have no such hydrogen and/or group, it is possible to incorporate these according to a known method. The term "electrophilic atom or atomic group" herein means a hydrogen atom bonded to an electrophilic atom, such as an oxygen atom, or an electrophilic atomic group, such as a phosphoric group or sulfonic group. For example, in order to introduce an epoxy group into a resin, a compound having a reactive glycidyl group may be caused to react with the resin; if the resin is an acrylic resin, for example, an epoxy group may be introduced into the resin by incorporating a glycidyl group- containing monomer, such as glycidyl acrylate or glycidyl methacrylate, into an acrylic stock monomer.

The term "polyol compound" means a compound having a plurality of hydroxyl groups in a molecule thereof; generally, it is desirable that it has at least one polymer chain. More particularly, one having the following structure is preferably used: a molecule having a plurality of hydroxyl groups is centrally positioned and polymer chains extend from the individual hydroxyl groups, one hydroxyl group being present at the terminal of each of the polymer chains. Generally, it is desirable that a polyol compound have a low viscosity. In this respect, polyols compounds, such as polyether polyols, polyester polyols, and polyether polyester polyols, having a star- form structure, as described in Japanese Patent Publications (unexaminded) Nos. 124922/1984, 115624/1985, 137924/1985, and 137967/1985, are preferably used. For example, a compound expressed by the following formula is most preferably used:

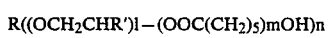

R((OCH$_2$CHR')l−(OOC(CH$_2$)$_5$)mOH)n (wherein R represents a residual group of a polyhydroxy compound after exclusion of a hydroxyl group; R' represents a hydrogen atom or a methyl group; l and m are both 0 or positive integer, but l+m is at last 1; n is 3 or a larger integer.)

A polyester resin can be obtained by condensation of a polyvalent carboxylic acid and a polyvalent alcohol. As the polyvalent carboxylic acid, the following are mentioned: trimellitic acid, trimellitic anhydride, phthalic acid, phthalic anhydride, isophthalic acid, terephthalic acid, and adipic acid. To give examples of polyvalent alcohol, the following are usually mentioned: pentaerithritol, trimethylolpropane, trimethylolethane, glycerin, polyethlene glycol, 1, 6-hexane diol, neopentylglycol, propyleneglycol, and ethylene glycol.

For alkyd resins, in addition to polyvalent alcohols, fatty acids are used as their fatty components, including, for example, bean oil fatty acid, caster oil fatty acid, tall oil fatty acid, coconut oil fatty acid, and cottonseed oil fatty acid. Vegetable oils, such as soybean oil, caster oil, tall oil, coconut oil, cottonseed oil, and linseed oil, are also used.

An acrylic resin can be obtained through reaction of a (meth)acrylic acid or a derivative thereof with other desired polymeric monomer. Examples of derivatives of acrylic acids are: acrylates (of methyl, ethyl, and butylester, for example), methacrylates (of methyl, ethyl, and butylester, for example), nitrile derivatives (of acrylonitrile and methacrylonitrile, for example), styrene derivatives (of α-methylstyrene, for example).

A urea resin or a melamine resin can be produced by condensation of urea or melamine, as the case may be, with formaldehyde, and if required, alcohols (for example, methyl alcohol, ethyl alcohol, propyl alcohol, butyl alcohol, and the like) may be used as a part of the stock material for resin production, so that such resin may be used as an alkylated methylolurea resin or alkylated methylolmelamine resin.

A polyamide resin can be produced through a condensation reaction of an aliphatic diamine with a dibasic acid, or a ring opening polymerization reaction of a cyclic lactam. For the aliphatic diamine, 1, 2-ethane diamine, N, N'-dimethyl - 1, 2 - ethane diamine, and 1, 6 - hexane diamine are used, for example. For the dibasic acid, succinic acid, adipic acid, sebacic acid, and the like are selectively used. Examples of cyclic lactam are: α-pyrrolidone, ε-caprolactam, and ω-capryl lactam.

A polyurethane resin is produced through reaction of a polyhydroxy compound, for example, an oil- free polyester resin having a hydroxyl group, a long- oil or short- oil alkyd, an acrylic resin, or a polyether resin, with an isocyanate compound. Of above said polyhdroxy compounds, the polyhdroxy resin is a resin obtained by polymerizing propylene oxide, ethylene oxide, or the like by using sorbitol, pentaerythritol, saccharose, starch, or the like as an intitiator. For the isocyanate compound, diisocyanates, such as hexane ethylene diisocyanate, tolylene diisocyanate, and xylene diisocyanate, or polyvalent isocyanates, such as Desmodur N and Desmodur L, are used.

The number- average molecular weight of the resin is generally 500–100,000. Number- average molecular weight values are measured by gel permeation chromatography using the polystyrene standard. For the molecular weight of the resin, less than 20,000 (preferably less than 10,000) in the case of a polyol compound, 1,000–50,000 in the case of an acrylic resin, 500–10,000 in the case of a polyester resin, 200–4,000 in the case of an epoxy resin, and 1,000–20,000 in the case of a polyester resin, are respectively preferred. For polyol compounds in particular, a weight-average molecular weight/number- average molecular weight ratio is less than 3.5 and, preferably less than 3.0. If the number-average molecular weight is more than 20,000, the viscosity of a paint resin produced by reaction of the resin with an aluminum chelate compound is considerably high and the paint resin is liable to gel. If the weight-average molecular weight/number- average molecular weight ratio is more than 3.5, the paint resin produced is similarly high and liable to gel.

According to the invention, an aluminum chelate compound is caused to react with a resin having an active hydrogen and/or epoxy group bonded to aforesaid electropilic atom and atomic group. From the above mentioned theory that pigments are basic, acidic or amphoteric, it may be considered that when an acidic group or a basic group, or both are introduced into the resin as required, improved dispersibility can be obtained. Both introduction of an acidic group and introduction of a basic group are carried out by a method known in the art. If the resin has an acidic value, such value of the resin is less the 10, and preferably within the range of 1–5.

Generally, an acidic group is introduced by using an acidic group introducing reagent. The term "acidic agent" herein means an electrophilic group, which is, for example, a carboxylic group or a sulfonic group. For introduction of an acidic group, a reagent capable of introducing a carboxylic acid is most commoly used. Typical examples of such reagent are phthalic anhydride, isophthalic acid, terephthalic acid, succinic anhydride, adipic acid, azelaic acid, sebacic acid, tetrahydrophthalic anhydride, hexahydrophthalic anhydride, tetrabromphthalic anhydride, tetrachlorophthalic anhydride, HET anhydride, hymic anhydride, maleic anhydride, fumaric acid, itaconic acid, trimellitic anhydride, methylcyclohexene tricarboxylic anhydride, and pyromellitic anhydride. Of these, dibasic acid anhydrides, such as phthalic anhydride and maleic anhydride, are particularly preferred.

A basic group introduced by a basic group introducing reagent means an electron donor group, a typical example of which is a group containing a nitrogen atom having a pair of non-shared electrons. Examples of basic group introducing reagents are: isocyanate compounds, e.g., naphthalene diisocyanate, phenylene diisocyanate, isophorone diisocyanate, tolyl isocyanate, diphenylether diisocyanate, hexamethylene diisocyanate, tolylene diisocyanate, xylene diisocyanate, diphenylmethane diisocyanate, and the like monomer compounds, or polymeric compounds of them with less toxicity (for example, hexamethylene diisocyanate compounds, such as "Duranate EXPD -101" (Asahi Chemical Industry Co.), "Desmodule TPL -2291" (Sumitomo Bayer), and "Coronate EH" (Nippon Polyurethane); xylene diisocyanate compounds, such as "Takenate D120N" (Takeda Chemical Industries, Ltd.); isophorone diisocianate compounds, such as "Desmodule Z -4370" (Sumitomo Bayer); melamine compounds, for example, compounds produced by condensation of melamine and formaldehyde, or compounds produced in the presence of alcohol during such condensation (methylated melamine: "Cymel 303", "Cymel 300" (Mitsui Toatsu), "Sumimar 40W" (Sumitomo Chemical); n- butylated melamines, such as "U-van 20SE-60" (Mitsui Toatsu); isobutylated melamines, such as "MF-013" (Nippon Paint); hydroxyl amine compounds, such as monoethanol amine, diethanol amine, aminopentanol, aminobenzyl alcohol, and 2-dimethyl aminoethanol; amino acid compounds, such as 3-dimethyl amino benzoic acid, 2-amino butyric acid, and 4-amino-n-butyric acid. Of these, isocyanate compounds and melamine compounds are particularly preferred.

For the aluminum chelate compound, those expressed by the following formula are preferably used.

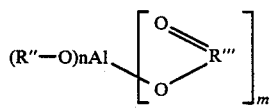

(where R″ represents a lower alkyl group, R‴ represents $C R_1-C H=C R_2$ (in which $R_1$ and $R_2$, each represents a lower alkyl group or a low alkoxy group), m is an integor of 1–3, n is an integer of 0–2, and m+n is 3.) In the above formula, alkylated portion (R—O —) only reacts with an active hydrogen or epoxy group in the resin. However, it is considered that the chelate portion (. . . O—R‴—O —) will remain as such.

Examples of aluminum chelate compounds are: diisopropoxy aluminum mono- oleyl acetoacetate, diisopropoxy aluminum mono- lauryl acetoacetate, diisopropoxy alminum mono- stearyl acetoacetate, dipropoxy aluminum monoisostearyl acetoacetate, diisopropoxy aluminum ethyl acetoacetate, monoisopropoxy aluminum bisoleyl acetoacetate, monoisopropoxy aluminum mono- oleate monoethyl acetoacetate, aluminum tris- ethyl acetoacetate, aluminum monoacetyl acetonate bis- ethyl acetoacetate, and aluminum tris-acetylacetonate. However, the scope of aluminum chelate compound is not limited to these.

The relative reaction proportions of the resin and the aluminum chelate compound are preferably 2–20 parts by weight of the latter to 100 parts by weight of the former. If the proportion of the aluminium chelate compound is more than above shown, gelation is likely to take place, and if the proportion is less than shown, the resin cannot be provided with sufficient pigment dispersing power.

The reaction temperature is generally less than 150° C., and preferably about 80° C. If it is higher than 150° C., gelation is likely to occur.

A paint resin thus obtained has excellent storage stability. It is considered that the paint resin has at least one chelate group remaining unreacted, and that when a pigment is dispersed, a functional group corresponding to an acidic or basic group which is present on the despersed pigment surface will go into bond with the unreacted chelate through covalent bonding.

A pigment paste obtained by dispersing the pigment in the paint resin has excellent storage stability, and if kept in storage for a long time, it is not liable to increase in viscosity, change in coloring power, or deterioration in luster.

The range of pigments available for use is not particularly limited. Various kinds of pigments, both organic and inorganic, can be used. Examples of inorganic pigments are: zinc oxide, titanium oxide, antimony white, carbon black, black iron oxide, red oxide, red lead oxide, cadmium yellow, zinc sulfide, lithopone, barium sulfide, lead sulfate, barium carbonate, lead white, and alumina white. Example of organic pigments are: azopigments, polycondensed pigments, metal complex azopigments, benzimidazolone, phtalocyanine (blue, green), thioindigo, anthraquinone, flavanthrone, indanthrene, anthrapyridine, pyranthrone, isoindolinone, perylene, perinone, and quinacridone.

The proportion of pigment for use is usually 10–90% (by weight), preferably 30–70% ( by weight) relative to the total weight of pigment and resin.

A pigment paste may, as stated above, consist of the paint resin of the invention and a pigment, but unless its dispersibility is adversely affected, it may suitably incorporate some resin, solvent, additive, and if necessary, hardener.

The pigment paste prepared as above stated is kept in storage, and when necessary, it is uniformly mixed with a separate paint resin into a coating composition.

For such separate resin, various kinds of resins can be used. For example, the following may be mentioned: oil- free polyester resins, long- oil alkyd resins, short-oil alkyd resins, acrylic resins, melamine resins, epoxy resins, polyurethane resins, polyamide resins, urea resins, and polyether resins. Polyol compounds having a star-form structure which are used in the paint resin composition of the invention, and the paint resin of the invention may be used as said separate paint resin.

The range of mixing ratios between the pigment paste and a paint resin is not particularly limited, but generally it is 1:99–99:1. Any suitable resin, solvent, modifier, and the like may be incorporated as required.

In connection with the foregoing description, solvents useful for incorporation into the pigment paste or the paint composition, if required, are, for example, hydrocarbon solvents (such as toluene, xylene, solvesso 100, and solvesso 150), ester- based solvents (such as ethyl acetate and butyl acetate), and ketone- based solvents (such as methylethyl ketone and methylbutyl ketone).

For preparation of aforesaid pigments paste and paint composition, conventional dispersion mixing means may be employed. For example, dispersion machines, such as roll mill, ball mill, sand mill, planetary mixer, and high- speed dispersens, are used.

A paint composition prepared as above described can form a coating having excellent coat appearance.

EXAMPLES

Nextly, the invention will be described in further detail with reference to the following examples and comparative examples.

EXAMPLE 1

To 1000 g of a pentaerythritol polymer (prepared by polymerizing pentaerythritol and propylene oxide according to a method described in the specification of Japanese Provisional Patent Publication No. 15933 of 1983; Mn=2) were added 300 g of ϵ-caprolactone and 1 g of di-n-butyltinoxide, and reaction was carried out at about 180 ° C. for 2 hr. Reaction product A thus obtained had Mn 2,600 and Mw/Mn=1.45.

To 100 g of reaction product A were added 10.5 g of diisopropoxy aluminum ethyl acetoacetate and 12.3 g of xylene, and reaction was carried out at 70° C. for about 1 hr. As a result, a light yellow colored, oily paint resin of low viscosity was obtained.

EXAMPLE 2

To 100 g of Example 1 reaction product A were added 2.8 g of phthalic anhydride and 12.0 g of xylene, and an acidic polymer (Mn=2,672; Mw/Mn=1.51;

acidic value=10.3) was obtained after reflux at 150° C. for about 2 hr.

To 50 g of the acidic polymer so obtained (nonvolatile content 100%) were added 6 g of xylene and 2.58 g of diisopropoxy aluminum ethyl acetoacetate, and reaction was carried out at 70° C. for about 1 hr. As a result, a light yellow colored, oily paint resin of low viscosity was obtained.

EXAMPLE 3

To 100 g of Example 1 reaction product A were added 4.5 g of phthalic anhydride and 12.0 g of xylol, and reflux was carried out at 150° C. for about 2 hrs. As a result, an acidic polymer (Mn=2,710; Mw/Mn=1.55) was obtained.

To 50 g of the acidic polymer obtained (nonvolatile content 100%) were added 6 g of xylol and 1.53 g of isopropoxy aluminum ethyl acetoacetate, and reaction was carried out at 70° C. for about 1 hr. As a result, a light yellow colored, oily paint resin of low viscosity was obtained.

EXAMPLE 4

To 100 g of Example 1 reaction product A were added 6.2 g of phthalic anhydride and 11.9 g of xylene, and reflux was carried out at 150° C. for about 2 hrs. An acidic polymer (Mn=2,758; Mw/Mn=1.60; acidic value=22.1) was thus obtained.

To 50 g of the acidic polymer so obtained (nonvolatile content 100%) were added 6 g of xylol and 0.52 g of diisopropoxy aluminumethyl acetoacetate, and reaction was carried out at 70° C. for about 1 hr. As a result, a light yellow colored, oily pain resin of low viscosity was obtained.

EXAMPLE 5

To 200 g of Example 1 reaction product A were added 3.4 g of phthalic anhydride and 25 g of xylene, and reflux was carried out at 150° C. for about 2 hrs. Thus, an acidic polymer (Mn=2,640; Mw/Mn=1.50; acidic value=6.3) was obtained.

To 50 g of the acidic polymer (nonvolatile content 100%) were added 6 g of xylol and 5.41 g of diisopropoxy aluminumethyl acetoacetate, and reaction was carried out at 70° C. for about one hour. As a result, a light yellow colored, oily paint resin was obtained.

EXAMPLE 6

To 50 g of the acidic polymer obtained in Example 5 (nonvolatile content 100%) were added 6 g of xylene and 1.7 g of a melamine resin "U-van 128" (Mitsui Toatsu) (Mn=1,103; Mw/Mn=1.89), and reflux was carried out at 140° C. for about 2 hr. Thus, a acidic basic modified polymer (Mn=2,720; Mw/Mn=2.15; acidic value=6.2) was obtained.

To the so obtained acidic/basic modified polymer was added 5.41 g of diisopropoxy aluminumethyl acetoacetate, and reaction was carried out at 70° C. for about 1 hr. As a result, a light yellow colored, oily paint resin of low viscosity was obtained..

EXAMPLE 7

To 100 g of Example 1 reaction product A were added 5.6 g of phthalic anhydride and 12.6 g of xylene, and reflux was carried out at 150° C. for about 2 hr. Thus, an acidic polymer (Mn=2,670 ; Mw/Mn=1.53, acidic value=20.6) was obtained.

To 50 g of the so obtained acidic polymer (nonvolatile content 100%) were added 6 g of xylene and 5.35 g of diisopropoxy aluminumethyl acetoacetate, and reaction was carried out at 70° C. for about 1 hr. Gelation occurred.

EXAMPLE 8

To 100 g of Example 1 reaction product were added 4.5 g of phthalic anhydride and 12.5 g of xylene, and reflux was carried out at 150° C. for about 2 hrs. Thus, an acidic polymer (Mn=2,714; Mw/Mn=1.60; acidic value=16.3) was obtained.

To 50 g of the so obtained acidic polymer (nonvolatile content 100%) were added 6 g of xylene and 3.68 g of diisopropoxy aluminumethyl acetoacetate, and reaction was carried out at 70° C. for about 1 hr. Gelation occurred.

COMPARATIVE EXAMPLE 1

The acidic polymer obtained in Example 5 and which remained unreacted with aluminum chelate was used as a comparative paint resin.

COMPARATIVE EXAMPLE 2

The acidic/basic modified polymer obtained in Example 6 and which remained unreacted with aluminum chelate was used as a comparative paint resin.

EXAMPLE 9

Into a reactor were introduced 14.3 parts of coconut oil, 8.3 parts of trimethylolethane, and 0.01 part of di-n butyltinoxide, and the stock was heated to 220° C. for ester exchange reaction. After cooling, 5.2 parts of ethylene glycol, 6.0 parts of trimethylolethane, and 31.6 parts of phthalic anhydride were added into the reactor, and the reactor content was heated to 230° C. Acidic value of the reactor content was measured while the content was being dehydrated. When the acidic value reached 0.8, the content was cooled, and 40.0 parts of xylene were added. Thus, the polyester resin 1 was obtained. The number- average molecular weight of the resin was measured at 1900 by GPC. The resin 1 was heated up to 80° C., and then 6.0 parts of diisopropoxy aluminum ethyl acetoacetate were added. After lagged 1 hr, the content was cooled. This, alkyd resin 1 A was obtained.

EXAMPLE 10

Into the reactor were introduced 35.1 parts of isophthalic acid, 4.4 parts of azelaic acid, 4.6 parts of trimethylol propane, 15.4 parts of neopentyl glycol, 8.7 parts of 1, 6 hexanediol, and 0,01 part of di -n butyltinoxide, and the stock was heated to 230° C. in a nitrogen atmosphere. Acidic value to the reactor content was measured while the content was being dehydrated. When the acidic value reached 8, the content was cooled, and 40.0 parts of xylene were added. Thus, polyester resin 2 was obtained. The number- average molecular weight of the resin was measured at 2200 by GPC. The resin 2 was heated to 80° C., and 10.0 parts of aluminum tris-ethyl acetoacetate were added. After lagged 1 hr, the content was cooled. Thus polyester resin 2A was obtained.

EXAMPLE 11

To 100 parts of the polyester resin 2 obtained in Example 10 were added 5 parts of "U-van 128" (Mitusi Toatsu), and the mixture was heated to 80° C. Reaction was continued until the rise in viscocity become constant. Thus, polyester resin 3 was obtained. Further, 3.0 parts of diisopropoxy aluminumethyl acetoacetate were added to the resin 3 at 80° C., and after lagged 1 hr, the content was cooled. Thus, polyester resin 3A was obtained.

EXAMPLE 12

Into the reactor were introduced 30.6 parts of isophthalic acid, 14.9 parts of azelaic acid, 3.7 parts of trimethylol propane, 19.2 parts of neopentyl glycol, 10.9 parts of 1, 6 -hexanediol, and 0.01 part of di-n butyltinoxide, and the stock was heated to 230° C. in a nitrogen atmosphere. Acidic value was measured while the content was being dehydrated. When the acidic value reached 10, the content was cooled, and 40.0 parts of xylene were added. Thus, polyester resin 4 was obtained. The number-average molecular weight of the resin was measured at 1000 by GPC. The resin 4 was heated to 80° C., and 6.0 parts of aluminum tris-ethyl acetoacetate were added. After lagged 1 hr, the content was cooled. Thus, polyester resin 4A was obtained.

EXAMPLE 13

Into the reactor were introduced 35.4 parts of isophthalic acid, 4.5 parts of azelaic acid, 5.7 parts of trimethylol propane, 14.5 parts neopentyl glycol, 8.2 parts of 1, 6-hexanediol, and 0.01 part of di -n butyltinoxide, and the stock was heated to 230° C. in a nitrogen atmosphere. Acidic value was measured while the content was being dehydrated. When an acidic value of 15 was reached, the content was cooled, and 40.0 parts of xylene were added. Thus, polyester resin 5 was obtained. The number- average molecular weight of the resin was measured at 2100 by GPC. The resin 5 was heated to 80° C., and 3.0 parts of diisopropoxy aluminumethyl acetoacetate were added. Gelation occurred.

EXAMPLE 14

Into the reactor were introduced 35.4 parts of isophthalic acid, 4.5 parts of azelaic acid, 5.7 parts of trimethylol propane, 14.5 parts neopentyl glycol, 8.2 parts of 1, 6-hexanediol, and 0.01 part of di -n butyltinoxide, and the stock was heated to 230° C. in a nitrogen atmosphere. Acidic value was measured while the content was being dehydrated. When an acidic value of 15 was reached, the content was cooled, and 40.0 parts of xylene were added. Thus, polyester resin 6 was obtained. The number- average molecular weight of the resin was measured at 2100 by GPC. The resin 6 was heated to 170° C., and 3.0 parts of diisopropoxy aluminumethyl acetoacetate were added. Gelation occurred.

COMPARATIVE EXAMPLES b 3–6

The polyester resin 1 obtained in Example 9, the polyester resin 2 obtained in Example 10, the polyester resin 3 obtained in Example 11, and the polyester resin 4 obtained in Example 12 were used, respectively as Comparative Examples 3, 4, 5, and 6, for pigment dispersion.

EXAMPLE 15

Into a reactor provided with a condenser pipe, a nitrogen feed pipe, a thermometer, and an agitating blade were introduced 1000 parts of xylene, and the stock was heated to 130° C. A solution comprising 67.1 parts of methyl methacrylate, 542.5 parts of styrene, 224.8 parts of normal butylacrylate, 165.6 parts of hydroxyethyl acrylate, and 60 parts of azo-bis-isobutylonitrile was charged into a dropping funnel. At 130° C. and in a nitrogen atmosphere the content of the dropping funnel was caused to drop at a uniform rate for 3 hrs. After completion of the dropping, the content of the reactor was kept at 130° C. for 30 min. Then, a solution comprising 6 parts of azo-bis-isobutylonitrile and 800 parts of xylene was charged into the dropping funnel, and the same was caused to drop at a uniform rate for 30 min. After completion of dropping, the reactor content was kept at 130° C. for 2 hrs. Polymerization was thus, completed, and the polymerizate was cooled. Thus, acrylic resin 1 was obtained. The number-average molecular weight of this acrylic resin was 3500. The acrylic resin was heated to 180° C., and 30 parts of diisopropoxy aluminum ethyl acetoacetate were added. After lagging at 80° C. for 1 hr, acrylic resin 1A was obtained.

EXAMPLE 16

Into a reactor provided with a condenser pipe, a nitrogen feed pipe, a thermometer, and an agitating blade were introduced 1000 parts of xylene, and the stock was heated to 140° C. A solution comprising 55.8 parts of methyl methacrylate, 558.6 parts of styrene, 126.9 parts of lauryl methacrylate, 248.8 parts of hydroxyethyl acrylate, 10.3 parts of acrylic acid, and 60 parts of azo-bis-isobutylonitrile was charged into a dropping funnel. At 140° C. and in a nitrogen atmosphere the content of the dropping funnel was caused to drop at a uniform rate for 3 hrs. After completion of the dropping, the content of the reactor was kept at 140° C. for 30 min. Then, a solution comprising 6 parts of azo-bis-isobutylonitrile and 800 parts of xylene was charged into the dropping funnel, and the same was caused to drop at a uniform rate for 30 min. After completion of dropping, the reactor content was kept at 140° C. for 2 hrs. Polymerization was thus completed, and the polymerizate was cooled. Thus, acrylic resin 2 was obtained. The number- average molucular weight of this acrylic resin 2 was 2100. The acrylic resin 2 was heated to 80° C., and 100 parts of diisopropoxy aluminum ethyl acetoacetate were added. After lagging at 80° C. for 1 hr, acrylic resin 2A was obtained.

EXAMPLE 17

To 100 parts of the acrylic resin 2 obtained in Example 16 were added 5 parts of "U-van 128" (a product of Mitsui Toatsu). The reactor content was heated to 80° C. and reaction was continued until the rise in viscosity reached a constant level. Thus, acrylic resin 3 was obtained. At 80° C., 3.0 parts of diisopropoxy aluminum ethyl acetate were added to the resin 3. After lagging 1 hr, the reactor content was cooled. Thus, acrylic resin 3A was obtained.

EXAMPLE 18

Into a reactor provided with a condenser pipe, a nitrogen feed pipe, a thermometer, and an agitating blade were introduced 1000 parts of xylene, and the stock was heated to 130° C. A solution comprising 433.9 parts of methyl methacrylate, 213.9 parts of styrene, 202.3 parts of lauryl methacrylate, 124.2 parts of hydrxyethyl acrylate, 25.7 parts of acrylic acid, and 30 parts of azo-bis-isobutylonitrile was charged into a dropping funnel. At 130° C. and in a nitrogen atmosphere the content of the dropping funnel was caused to drop at a uniform rate for 3 hrs. After completion of the dropping, the content of the reactor was kept at 130° C. for 30 min. Then, a solution comprising 6 parts of azo-bis-isobutylonitrile and 800 parts of xylene was charged into the dropping funnel, and the same was caused to drop at a uniform rate for 30 min. After completion of dropping, the reactor content was kept at 130° C. for 2 hrs. Polymerization was thus completed, and the polymerizate was cooled. Thus, acrylic resin 4 was obtained. The number- average molecular weight of this acrylic resin 4 was 6000. The acrylic resin 4 was heated to 80° C., and 30 parts of diisopropoxy aluminum ethyl acetoacetate were added. Gelation resulted.

COMPARATIVE EXAMPLES 7-9

The acrylic resin 1 obtained in Example 15, the acrylic resin 2 obtained in Example 16, and the acrylic resin 3 obtained in Example 17 were used, respectively as Comparative Examples 7, 8, and 9, for pigment dispersion.

EXAMPLE 19

Into a reactor provided with a condenser pipe, a nitrogen feed pipe, a thermometer, and an agitating blade were introduced 100 parts of xylene, and 100 parts of "Epikote 1001" (a product of Shell Chemical), and the stock was heated to 70° C. and completely dissolved. Subsequently, 8 parts of diisopropoxy aluminum ethyl acetoacetate were added. After kept at 70° C. for 1 hr, the reactor content was cooled. Thus, epoxy resin 1 was obtained.

EXAMPLE 20

Into a reactor provided with a condenser pipe, a nitrogen feed pipe, a thermometer, and an agitating blade were introduced 100 parts of xylene, and 100 parts of "Epikote 1004" ( a product of Shell Chemical), and the stock was heated to 90° C. and completely dissolved. Subsequently, 10 parts of aluminum tris-ethyl acetoacetate were added. After kept at 90° C. for 1 hr, the reactor content was cooled. Thus, epoxy resin 2 was obtained.

EXAMPLE 21

Into a reactor provided with a condenser pipe, a nitrogen feed pipe, a thermometer, and an agitating blade were introduced 100 parts of xylene, and 100 parts of "Epikote 1009" (a product of Shell Chemical), and the stock was heated to 90° C. and completely dissolved. Subsequently, 10 parts of diisopropoxy aluminum ethyl acetoacetate were added. Gelation resulted.

COMPARATIVE EXAMPLES 10-12

Epikote 1001 in Example 19, Epikote 1009 in Example 20, and Epikote 1009 were used, respectively as Comparative Examples 10, 11, and 12, for pigment dispersion.

EXAMPLE I

Preparation of Pigment Paste (1) Preparation of blue color paste

To 20.8 parts of each of the paint resins produced in Examples 1-6 and Comparative Examples 1, 2 were added 12.5 parts of a blue pigment "Fastgen Blue NK" (Dainippon Ink & Chemicals), 16.7 parts of xylene, and 50 parts of glass beads, and the mixture was shaken by a paint shaker for 1 hr. The properties of dispersed pastes were as shown in Table 1.

(2) Preparation of black color paste

To 25.0 parts of each of the paint resins produced in Examples 1-16 and Comparative Examples 1-12 were added 5 parts of a black pigment "Carbon Black MA - 100 (Mitsubishi Carbon), 20 parts of xylene, and 50 parts of glass beads, and the mixture was shaken by a paint shaker for 1 hr. The properties of dispersed pastes were as shown in Tables 1-4.

TABLE 1

| | | Example | | | | | | Comp Exp | |
|---|---|---|---|---|---|---|---|---|---|
| | | 1 | 2 | 3 | 4 | 5 | 6 | 1 | 2 |
| Blue paste | Viscosity (cps) | 1100 | 820 | 750 | 720 | 906 | 1050 | 1330 | 1540 |
| | Spec gloss[1] | 46 | 61 | 65 | 70 | 53 | 49 | 32 | 28 |
| Black paste | Viscosity (cps) | 420 | 498 | 550 | 580 | 440 | 398 | 1000 | 920 |
| | Spec gloss[1] | 64 | 57 | 50 | 48 | 59 | 63 | 36 | 30 |

Note:
[1] 20° specular gloss, measured by fineness-of-grind gauge, 10μ

TABLE 2

| | Polyester resin | | | | | | | |
|---|---|---|---|---|---|---|---|---|
| Kind of resin | Example 5 | Example 6 | Example 7 | Example 8 | Comp Exp 3 | Comp Exp 4 | Comp Exp 5 | Comp Exp 6 |
| Resin No. | 1A | 2A | 3A | 4A | 1 | 2 | 3 | 4 |
| Spec gloss[1] | 65 | 62 | 67 | 58 | 40 | 48 | 55 | 47 |
| Viscosity[2] (cps) | 80 | 110 | 90 | 93 | 730 | 480 | 140 | 420 |
| Yield value[3] | 0 | 5 | 2 | 8 | 68 | 37 | 8 | 40 |

[1] Unit cps; measured by E type viscosimeter
[2] 20° specular gloss value, measured by fineness-of-grind gauge, 10μ
[3] Measured by E type viscosimeter

TABLE 3

| | Acrylic resin | | | | | |
|---|---|---|---|---|---|---|
| | Example | | | Comp Exp | | |
| Kind of resin | 11 | 12 | 13 | 7 | 8 | 9 |
| Resin No. | 1A | 2A | 3A | 1 | 2 | 3 |
| Spec gloss[1] | 83 | 78 | 84 | 55 | 65 | 72 |
| Viscosity[2] (cps) | 450 | 600 | 420 | 1720 | 1200 | 700 |

TABLE 3-continued

| | Acrylic resin | | | | | |
|---|---|---|---|---|---|---|
| | Example | | | Comp Exp | | |
| Kind of resin | 11 | 12 | 13 | 7 | 8 | 9 |
| Yield value[3] | 2 | 6 | 1 | 63 | 20 | 7 |

[1]Unit cps; measured by E type viscosimeter
[2]20° specular gloss value, measured by fineness-of-grind gauge, 10μ
[3]Measured by E type viscosimeter

TABLE 4

| | Epoxy resin | | | | |
|---|---|---|---|---|---|
| | Example | | Comp Exp | | |
| Kind of resin | 15 | 16 | 10 | 11 | 12 |
| Resin No. | 1 | 2 | 1001 | 1004 | 1009 |
| Spec gloss[1] | 73 | 72 | 42 | 40 | 45 |
| Viscosity[2] (cps) | 200 | 300 | 1400 | 1800 | 2500 |
| Yield value[3] | 0 | 0 | 260 | 200 | 180 |

[1]Unit cps; measured by E type viscosimeter
[2]20° specular gloss value, measured by fineness-of-grind gauge, 10μ
[3]Measured by E type viscosimeter

EXAMPLE II

Preparation of Paint

To 60 g of a melamine alkyd-based white paint "New Orga 130" (Nippon Paint) was added 2.0 go of each of the dispersion pastes prepared in the foregoing examples, and thus a paint was prepared.

Formation of Coating

Each paint thus prepared was applied by spraying to a stain-finished steel plate which had already been subjected to surface preparation. Baking was effected at 140° C. for 30 min. The surface characteristics of the coat produced were as shown in Table 5.

After kept in storage at 40° C. for two weeks, each paint was similarly applied for surface coating. The surface characteristics of the coat thus produced were as shown in Table 5.

TABLE 5

| Paint | Condition | | Example | | | | | | Comp Exp | |
|---|---|---|---|---|---|---|---|---|---|---|
| | | | 1 | 2 | 3 | 4 | 5 | 6 | 1 | 2 |
| Blue/White paint | Before storage | Paint viscosity (cps) | 600 | 542 | 540 | 510 | 545 | 576 | 680 | 750 |
| | | Spec gloss[2] | 65 | 70 | 72 | 75 | 70 | 67 | 63 | 60 |
| | | Coloring power (K/S) | 0.94 | 0.97 | 1.04 | 1.12 | 1.03 | 0.96 | 0.88 | 0.86 |
| | After storage | Paint viscosity (cps) | 611 | 570 | 552 | 530 | 590 | 603 | 930 | 1030 |
| | | Spec gloss[2] | 62 | 68 | 72 | 74 | 66 | 65 | 55 | 52 |
| | | Coloring power (K/S) | 0.93 | 0.93 | 1.01 | 1.06 | 0.98 | 0.94 | 0.74 | 0.70 |
| Black/White paint | Before storage | Paint viscosity (cps) | 490 | 516 | 580 | 610 | 506 | 480 | 720 | 701 |
| | | Spec gloss[2] | 75 | 70 | 67 | 65 | 70 | 77 | 64 | 65 |
| | | Coloring power (K/S) | 0.35 | 0.30 | 0.29 | 0.29 | 0.32 | 0.36 | 0.27 | 0.24 |
| | After storage | Paint viscosity (cps) | 521 | 545 | 604 | 640 | 515 | 500 | 850 | 810 |
| | | Spec gloss[2] | 73 | 67 | 65 | 64 | 70 | 75 | 58 | 54 |
| | | Coloring power (K/S) | 0.34 | 0.29 | 0.29 | 0.28 | 0.30 | 0.34 | 0.22 | 0.18 |

Note:
[2]20° specular gloss; after baking.

What is claimed is:

1. A resin for dispersing a pigment prepared by reacting an aluminum chelate compound with a resin having an active hydrogen bonded to an electrophilic atom or atomic group which is selected from the group consisting of a polyester resin, an alkyd resin, an acrylic resin, a polyamide resin, a melamine resin, a urea resin and a polyurethane resin, said reaction producing a resin chemically modified with said aluminum chelate compound, which modified resin is capable of dispersing a pigment added thereto and producing a coating having high gloss characteristics.

2. A paint resin as set forth in claim 1, wherein the resin has an acid value of less than 10.

3. A paint resin as set forth in claim 1, wherein the aluminum chelate compound is a diisopropoxy aluminum monoalkyl acetoacetate or an aluminum trisalkyl acetoacetate.

4. A paint resin as set forth in claim 1, wherein the reaction is carried out at temperatures of 0°–150° C.

5. A paint resin as set forth in claim 1, wherein the relative reaction proportions of the resin and the aluminum chelate compound is 2–20 parts by weight of the latter to 100 parts by weight of the former.

6. A paint resin as set forth in claim 1 wherein the resin is a polyester resin.

7. A paint resin as set forth in claim 1, wherein the resin is an alkyd resin.

8. A paint resin as set forth in claim 1, wherein the resin is an acrylic resin.

9. A paint resin as set forth in claim 1, wherein the resin is a polyamide resin.

10. A paint resin as set forth in claim 1 wherein the resin is a melamine resin.

11. A paint resin as set forth in claim 1 wherein the resin is a urea resin.

12. A paint resin as set forth in claim 1 wherein the resin is a polyurethane resin.

* * * * *